(12) United States Patent
DeLuca et al.

(10) Patent No.: US 11,262,277 B1
(45) Date of Patent: Mar. 1, 2022

(54) TEST CASE EXECUTION BASED ON WEATHER INFORMATION

(71) Applicant: International Business Machines Corporation, Armonk, NY (US)

(72) Inventors: Lisa Seacat DeLuca, Baltimore, MD (US); Schuyler Bruce Matthews, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/036,008

(22) Filed: Sep. 29, 2020

(51) Int. Cl.
*G06F 11/30* (2006.01)
*G01M 99/00* (2011.01)
*G01W 1/10* (2006.01)

(52) U.S. Cl.
CPC ............ *G01M 99/005* (2013.01); *G01W 1/10* (2013.01)

(58) Field of Classification Search
CPC .................................................. G01M 99/005
See application file for complete search history.

(56) References Cited

U.S. PATENT DOCUMENTS

| | | |
|---|---|---|
| 8,607,190 B2 | 12/2013 | Coldicott |
| 9,583,020 B1 * | 2/2017 | Kronfeld ............... G09B 19/00 |
| 2015/0224854 A1 | 8/2015 | Muller |
| 2017/0132117 A1 | 5/2017 | Stefan |

FOREIGN PATENT DOCUMENTS

| | | |
|---|---|---|
| CN | 103207090 A | 7/2013 |
| CN | 110681418 A | 1/2020 |

OTHER PUBLICATIONS

"Climate", Wikipedia, 18 pps., printed from the Internet on Sep. 21, 2020, <https://en.m.wikipedia.org/wiki/Climate>.
"IBM Watson Assistant for Citizens", 5 pps., printed from the Internet on May 26, 2020, <https://www.ibm.com/us-en/marketplace/engineering-lifecycle-management-ex>.

* cited by examiner

*Primary Examiner* — Phuong Huynh
(74) *Attorney, Agent, or Firm* — Stephanie L. Carusillo (57) ABSTRACT

Aspects of the present invention disclose a method, computer program product, and system for generating scheduling information for performing test cases for an asset at a location based on weather information. The method includes one or more processors receiving a set of parameters for an asset. The set of parameters including a test case set for the asset and an indication of a testing location for the asset. The method further includes one or more processors determining weather information associated with the indicated testing location. The method further includes one or more processors identifying a test case in the test case set that includes a weather variable that corresponds to weather present in the determined weather information of the indicated testing location. The method further includes one or more processors scheduling execution of the identified test case, at the indicated testing location, based on the determined weather information.

17 Claims, 6 Drawing Sheets

| Test ID | TEST CASE | OWNER | RESULT | SCHEDULE | FORECAST TEMP | FORECAST PRECIPITATION | FORECAST WIND |
|---|---|---|---|---|---|---|---|
| B1 | FREEZING TEMPERATURE ENGINE START | BOB | | 3/19/2020 6am | 24F | 0% | 6 mph |
| B2 | 40F ENGINE START | BOB | | 3/19/2020 3pm | 40F | 0% | 8 mph |
| B3 | HIGH WIND HAUL TEST | BOB | | 3/19/2020 9pm | 37F | 0% | 26 mph |
| B4 | 10 MPH BRAKE TEST - Rain | BOB | | 3/20/2020 1pm | 37F | 90% | 7 mph |
| B5 | 100 MPH TIRE TEST - Rain | BOB | | 3/20/2020 2pm | 40F | 90% | 7 mph |
| T1 | 40 MPH TIRE TEST - FREEZING RAIN | BOB | | 3/20/2020 6pm | 32F | 80% | 7 mph |

TEST CASE EXECUTION BASED ON WEATHER INFORMATION

BACKGROUND OF THE INVENTION

The present invention relates generally to the field of data management, and more particularly to test cases for product testing.

Product lifecycle management (PLM) is the process of managing the entire lifecycle of a product from inception, through engineering design and manufacture, to service and disposal of manufactured products. PLM integrates people, data, processes and business systems and provides a product information backbone for companies and their extended enterprise. An important aspect of PLM is product testing and quality control, throughout the development of a product. In engineering, a test case is a specification of the inputs, execution conditions, testing procedure, and expected results that define a single test to be executed to achieve a particular testing objective.

Weather forecasting is the application of science and technology to predict the conditions of the atmosphere for a given location and time. Weather forecasts are made by collecting quantitative data about the current state of the atmosphere at a given place and using meteorology to project how the atmosphere will change.

SUMMARY

Aspects of the present invention disclose a method, computer program product, and system for generating scheduling information for performing test cases for an asset at a particular location based on weather information for the location. The method includes one or more processors receiving a set of parameters for an asset. The set of parameters including a test case set for the asset and an indication of a testing location for the asset. The method further includes one or more processors determining weather information that is associated with the indicated testing location. The method further includes one or more processors identifying a test case in the test case set for the asset that includes a weather variable that corresponds to a weather variable that is present in the determined weather information that is associated with the indicated testing location. The method further includes one or more processors scheduling execution of the identified test case, at the indicated testing location for the asset, based on the determined weather information.

DETAILED DESCRIPTION

Embodiments of the present invention provide a method and system to execute test cases for an asset at a location using actual upcoming weather prediction information and historical weather information for a region or location. Accordingly, embodiments of the present invention allow for a test scheduling process that is based on weather prediction information that is matched to the test case, providing an improved method for understanding and executing test coverage for various operating conditions.

Some embodiments of the present invention recognize that the creation, management, and execution of test cases are a very important aspect of asset development and product (i.e., asset) lifecycle management. However, embodiments of the present invention also recognize that an asset development and management system is limited by the knowledge that is made accessible to the system (e.g., the knowledge and creativity of the test engineers). If the test engineers do not have the foresight to create a test case for a particular condition, then the condition will not be tested for. Accordingly, embodiments of the present invention recognize the advantages of providing the system with access to new data sources, such as weather information, to augment the generation and execution of test cases, and to populate new cases based on the data sources.

In addition, embodiments of the present invention can operate to receive a set of usage parameters of an asset (e.g., parameters of an asset under test from a test engineer). Embodiments of the present invention can then determine an indication of a location of a test of the asset and determine weather information associated with the location. Then, embodiments of the present invention can identify test cases that include weather variables that correspond to the determined weather information associated with the location. Further, embodiments of the present invention can schedule execution of the identified test cases and also generate additional test cases based on the determined weather information.

Implementation of embodiments of the invention may take a variety of forms, and exemplary implementation details are discussed subsequently with reference to the Figures.

Figure 1:
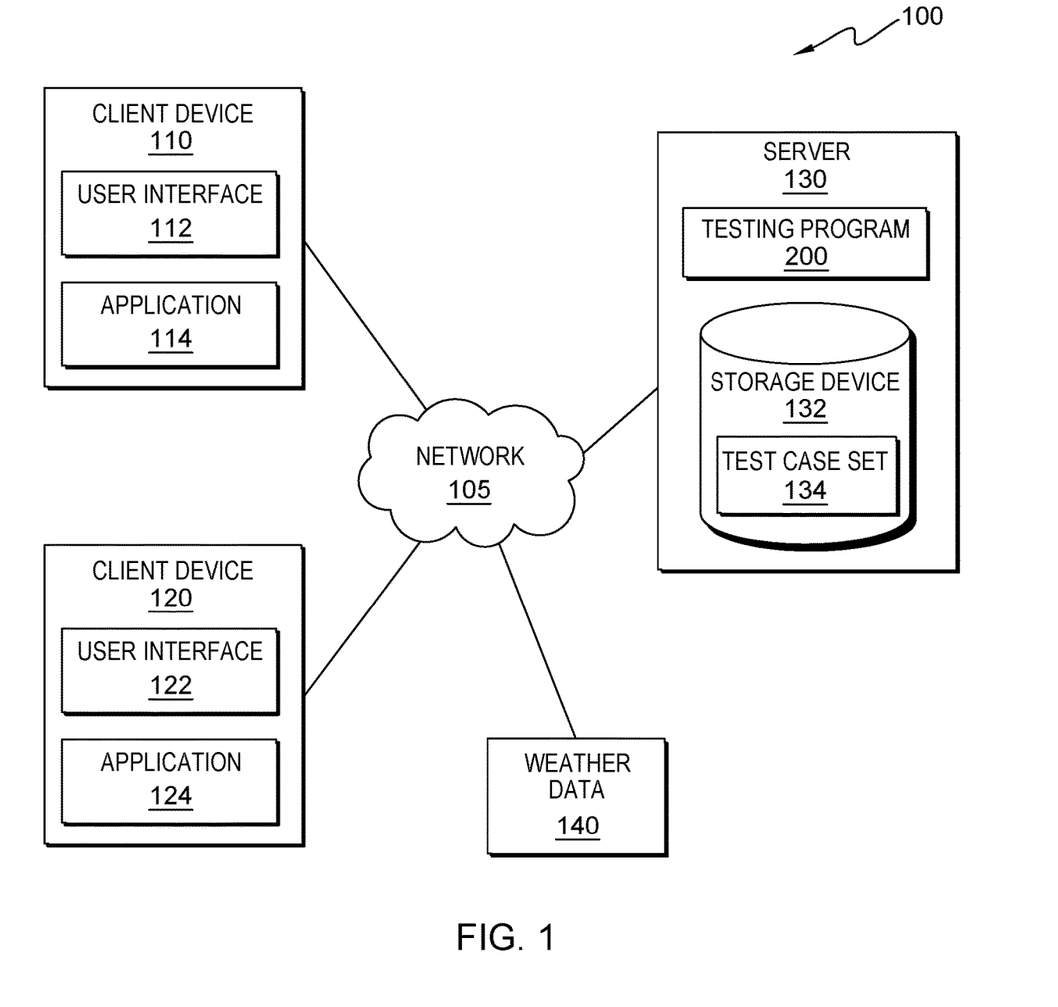
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 110, client device 120, server 130, and weather data 140, all interconnected over network 105. In an example embodiment, server 130 is representative of a computing device (e.g., one or more management servers) that provides product lifecycle management (PLM) services to one or more organizations and users, such as users associated with client device 110 and client device 120. In other embodiments, data processing environment 100 can include additional instances of computing devices (not shown) that can interface with server 130, in accordance with various embodiments of the present invention.

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between client device 110, client device 120, server 130, and weather data 140, in accordance with embodiments of the present invention. In various embodiments, network 105 facilitates communication among a plurality of networked computing devices (e.g., client device 110, client device 120, server 130, and other devices not shown), corresponding users (e.g., users of client device 110, client device 120, and server 130, etc.), and corresponding management services (e.g., server 130 and weather data 140).

In various embodiments of the present invention, client device 110 and client device 120 may be a workstation, personal computer, personal digital assistant, mobile phone, or any other device capable of executing computer readable program instructions, in accordance with embodiments of the present invention. In general, client device 110 and client device 120 are representative of any electronic device or combination of electronic devices capable of executing computer readable program instructions. Client device 110 and client device 120 may include components as depicted and described in further detail with respect to FIG. 4, in accordance with embodiments of the present invention.

In an example embodiment, client device 110 is a personal workstation or mobile device associated with (e.g., registered to) a user that is providing information in the process of creating/generating test cases for an asset (e.g., an engineer creating test cases for an asset). In one example, client device 110 is associated with an engineer that is creating a test case set for testing an asset. In an example scenario, Bob is a reliability engineer and is creating a set of test cases for a new truck. FIG. 3A is an example depiction of test case set 134, which includes test cases generated by users and by testing program 200, in accordance with various embodiments of the present invention. In the depicted example embodiment of test case set 134, Bob utilizes client device 110 to create test case set 134, which is depicted in further detail with regard to FIG. 3A. In this example scenario, Bob utilizes client device 110 to create test cases B1, B2, B3, B4, and B5 (indicated by the Test ID column) and populate the "Test Case" column with a description of the respective test case that includes test case parameters and/or variables. For Example, Bob creates test case B1 to be a test case for "Freezing Temperature Engine Start." Then, testing program 200 can populate additional columns for test case B1 with information, in accordance with various embodiments of the present invention (that are described in further detail with regard to FIG. 2).

In another example embodiment, client device 120 is a personal workstation or mobile device associated with (e.g., registered to) a user that is providing information in the process of inputting results of test cases for an asset (e.g., an engineer at the testing site, etc.). In an example scenario, the user of client device 120 can enter results of performed test cases in the "Result" column of test case set 134 of FIG. 3A.

Client device 110 and client device 120 include respective instances of user interface 112, user interface 122, application 114, and application 124. User interface 112 and user interface 122 are programs that provides an interface between a respective user of client device 110 and client device 120, and a plurality of applications that reside on the device (e.g., application 114 and application 124). A user interface, such as user interface 112 or user interface 122, refers to the information (such as graphic, text, and sound) that a program presents to a user, and the control sequences the user employs to control the program. A variety of types of user interfaces exist. In one embodiment, user interface 112 and/or user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 and/or user interface 122 is a script or application programming interface (API).

Application 114 and application 124 can be representative of one or more applications (e.g., an application suite) that operate on respective instances of client device 110 and client device 120. In various example embodiments, application 114 and application 124 can be an application that a user of client device 110 or client device 120 utilizes to send and/or receive data from server 130. For example, application 114 and application 124 can be a web browser that the user of client device 110 or client device 120 can access and utilize. In another example, application 114 and application 124 are enterprise-specific applications, associated with server 130 and/or the corresponding organization. In additional example embodiments, application 114 and application 124 can send data to, and receive data from, testing program 200 on server 130 (e.g., as a client-side application of testing program 200), in accordance with various embodiments of the present invention.

In example embodiments, server 130 can be a desktop computer, a computer server, or any other computer systems, known in the art. In certain embodiments, server 130 represents computer systems utilizing clustered computers and components (e.g., database server computers, application server computers, etc.) that act as a single pool of seamless resources when accessed by elements of data processing environment 100 (e.g., client device 110, client device 120, and other devices not shown). In general, server 130 is representative of any electronic device or combination of electronic devices capable of executing computer readable program instructions. Server 130 may include components as depicted and described in further detail with respect to FIG. 4, in accordance with embodiments of the present invention.

Server 130 includes testing program 200 and storage device 132, which includes test case set 134. In various embodiments of the present invention, server 130 operates as a computing system that provides product lifecycle management (PLM) services (for one or more assets) to one or more organizations and users, such as users associated with client device 110 and client device 120. In one embodiment, server 130 can host and store data associated with development and testing processes for one or more assets (e.g., in storage device 132). In additional embodiments, server 130 can access external data sources, such as weather data 140, to assist in providing PLM services (i.e., executing testing program 200), in accordance with various embodiments of the present invention.

In various embodiments of the present invention, the user of client device 110 (or client device 120) can register with server 130 (e.g., via a corresponding application). For example, the user completes a registration process, provides information, and authorizes the collection and analysis (i.e., opts-in) of relevant data provided by at least client device 110, by server 130 (e.g., user profile information, user contact information, authentication information, user preferences, or types of information, for server 130 utilize with testing program 200). In various embodiments, a user can opt-in or opt-out of certain categories of data collection. For example, the user can opt-in to provide all requested information, a subset of requested information, or no information. In additional embodiments, the user of client device 110 can define which information that server 130 can utilize in analyzing test case data (e.g., parameters, etc.) and in generating test cases, in accordance with embodiments of the present invention.

In example embodiments, testing program 200 generates scheduling information for performing test cases for an asset at a particular location based on weather information for the location, in accordance with embodiments of the present invention. In various embodiments, testing program 200 can determine weather information associated with a location for performing tests for an asset (based on provided usage parameters and testing location(s) of the asset. Then, testing program 200 can identify test cases for the asset that include weather variables that correspond to the determined weather information associated with the location. Further, testing program 200 can schedule execution of the identified test cases for the asset and also generate additional test cases based for the asset on the determined weather information.

In another embodiment, server 130 utilizes storage device 132 to store information associated with development and testing processes for one or more assets. For example, storage device 132 stores test case sets for a plurality of assets, such as test case set 134 (depicted in further detail in FIG. 3A), which corresponds to a particular asset. Storage device 132 can store additional test cases and test case sets (not shown). In additional embodiments, storage device 132 can store historical test case data (e.g., completed test case sets, etc.), asset parameters and requirements, user preference data, known asset parameters, testing requirements, etc. Storage device 132 can be implemented with any type of storage device, for example, persistent storage 405, which is capable of storing data that may be accessed and utilized by server 130, such as a database server, a hard disk drive, or a flash memory. In other embodiments, storage device 132 can represent multiple storage devices and collections of data within server 130.

In various embodiments, test case set 134 is a set of test cases that correspond to a particular asset. In the previously discussed example scenario, Bob is a reliability engineer and is creating a set of test cases for a new truck (i.e., an asset). In this example scenario, Bob utilizes client device 110 to create test case set 134, which is depicted in further detail with regard to FIG. 3A. In this example scenario, Bob utilizes client device 110 to create test cases B1, B2, B3, B4, and B5 (indicated by the Test ID column) and populate the "Test Case" column with a description of the respective test case that includes test case parameters and/or variables. For Example, Bob creates test case B1 to be a test case for "Freezing Temperature Engine Start." Then, testing program 200 can populate additional columns for test case B1 with information, in accordance with various embodiments of the present invention (that are described in further detail with regard to FIG. 2). In another aspect, the user of client device 120 can enter results of performed test cases in the "Result" column of test case set 134 of FIG. 3A.

Weather data 140 is representative of a weather service or other data resource that can provide historical weather data and weather forecast information in response to a request for a location. In one embodiment, weather data 140 can be a weather service (e.g., a weather application programming interface (API), or other application), that provides weather information and other meteorological values. In other embodiments, weather data 140 can be a database that includes weather information and other meteorological values, which a user can access and search for desired information (e.g., searched by the user of client device 110 and/or client device 120).

In example embodiments, weather data 140 can receive queries for weather information, and provides responses to the requesting entities (e.g., testing program 200, client device 110, etc.), in accordance with various embodiments of the present invention. For example, testing program 200 can send a request to weather data 140 for weather forecast information for the location of Bozeman, Mont. (i.e., a predicted weather forecast for one or more days). Accordingly, in response to the request, weather data 140 can provide the requested weather forecast information including temperature forecasts, wind forecasts, precipitation forecasts, and other available or requested forecast weather conditions.

In another embodiment, testing program 200 can send a request to weather data 140 for historical weather information for the location of Bozeman, Mont. Accordingly, in response to the request, weather data 140 can provide the requested historical information, including an average or median daily temperature, maximum temperature, minimum temperature, normal temperature values, historical weather conditions, forecast weather conditions, etc. In various aspects, the weather information can include temperature, humidity, atmospheric pressure, wind, precipitation, etc.

In an additional embodiment, weather data 140 can provide weather forecast information for a location that includes a weather forecast visualization on a weather forecasting map. For example, in response to receiving a request for a weather forecast for Mar. 20, 2019 and Mar. 20, 2020 in Bozeman, Mont., weather data 140 can provide an interactive weather forecast map visualization, which includes radar and weather forecast information overlaying a map of Bozeman, Mont.

In another embodiment, weather data 140 can be representative of a data repository that includes actual weather data gathered from assets that are currently in operation. For example, weather data 140 can include indications of where existing asserts are sold and in operation. In this example, the information can then feed into server 130 to provide relevant information on where similar assets are currently in operation, thus providing accurate operational information for the asset under test.

Figure 2:
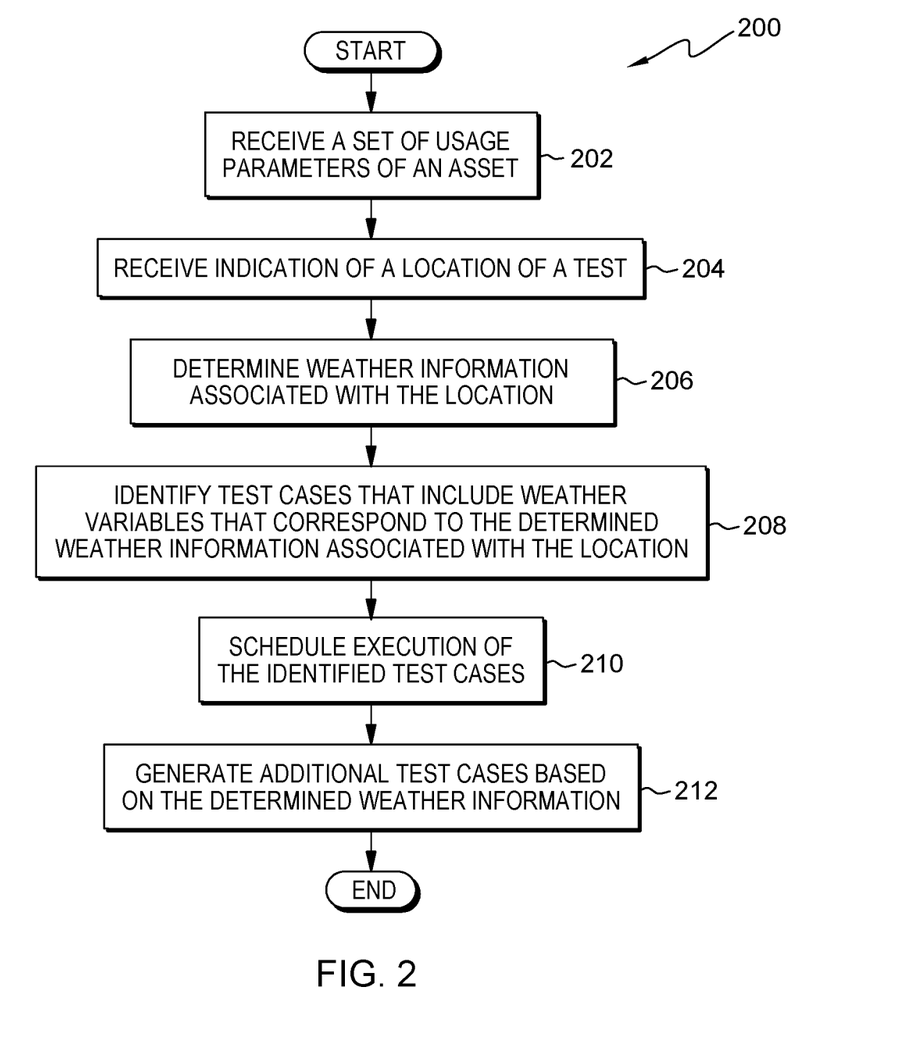
FIG. 2 is a flowchart depicting operational steps of a program for generating scheduling information for performing test cases for an asset at a particular location based on weather information for the location, in accordance with embodiments of the present invention.
Figure 3A:
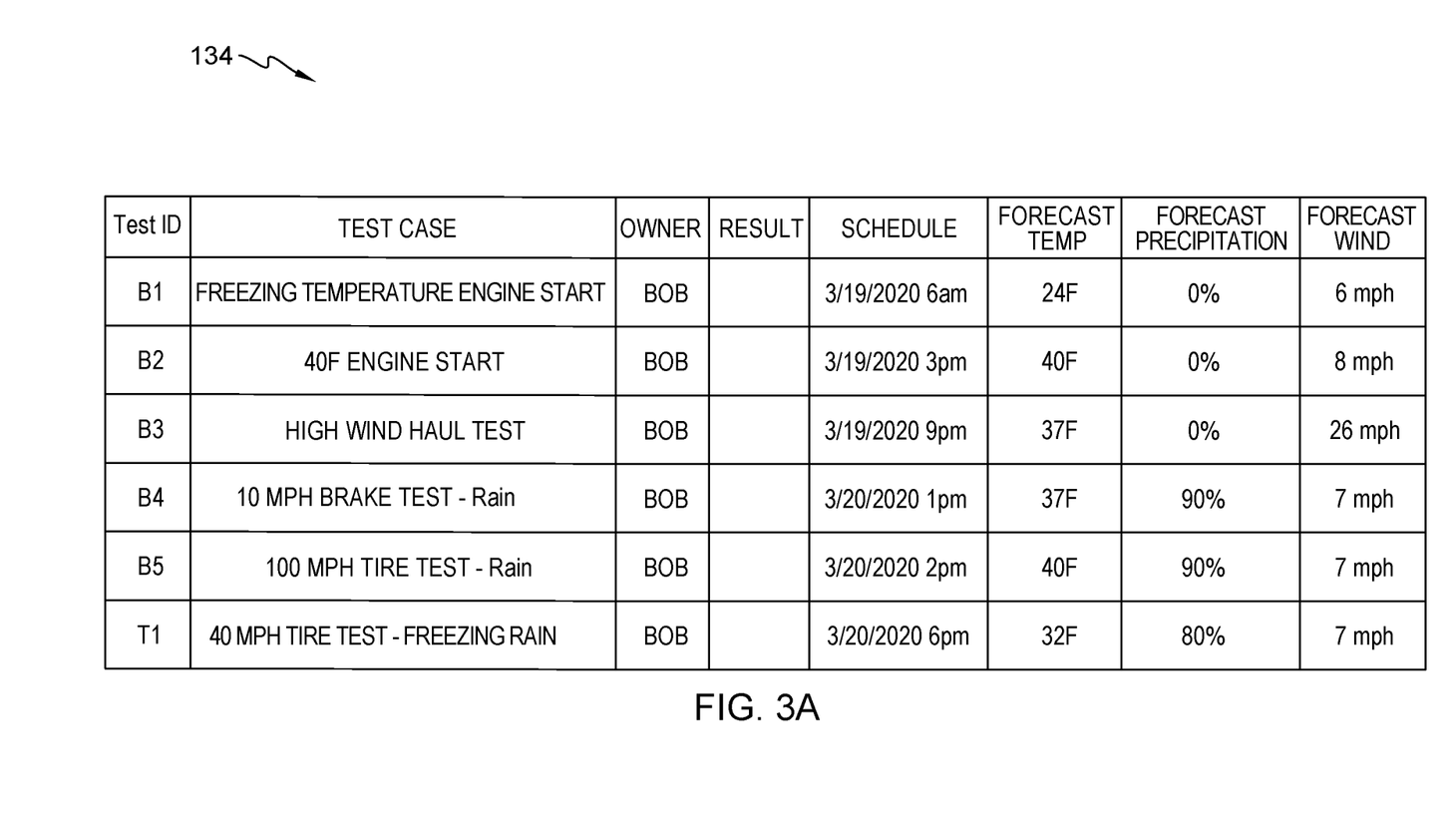
FIG. 3A is an example depiction of a test case set, which includes test cases generated by users and by testing program 200, in accordance with various embodiments of the present invention.

FIG. 2 is a flowchart depicting operational steps of testing program 200, a program for generating scheduling information for performing test cases for an asset at a particular location based on weather information for the location, in accordance with embodiments of the present invention. In one embodiment, testing program 200 initiates in response to a user request (e.g., a request to initiate from the user of client device 110). In another embodiment, testing program 200 can operate as a background process during test case creation and management, in accordance with various aspects of the present invention. In additional embodiments, server 130 utilizes testing program 200 to augment the existing test case generation and management processes that server 130 facilitates.

In step 202, testing program 200 receives a set of usage parameters of an asset. In one embodiment, testing program 200 receives a set of usage parameters of an asset under test, input by a user associated with testing the asset, such as a testing engineer that utilizes client device 110. In an example embodiment, the asset is an asset under test that corresponds to test case set 134. For example, an asset can be product or service that can undergo testing (e.g., with an engineering lifecycle management system for requirements management and test management). In an example with regard to FIG. 3A, the asset is a new truck that is undergoing testing.

In various embodiments, testing program 200 can receive a variety of different parameters, which provide information that relates to the operational conditions of the asset. For example, the testing engineer utilizing client device 110 provides usage parameters that indicate whether the asset will operate indoors or outdoors. In additional examples, for assets that can operate outdoors, the usage parameters can include indications of climates and locations for operating the asset (and corresponding dates and times of year). In an example scenario, as depicted in test case set 134 in FIG. 3A, testing engineer Bob (using client device 110) provides usage parameters that indicate the asset (i.e., the truck being tested) will operate outdoors. In addition, Bob also provides usage parameters that indicate operation of the asset in Bozeman, Mont. In another embodiment, the parameters can include an indication for scheduling test in the future (i.e., performing test cases in the coming week).

In step 204, testing program 200 receives an indication of a location of a test. In one embodiment, testing program 200 receives information (e.g., from a user of client device 110) that includes a testing location and a time window to perform test cases for the asset. For example, testing program 200 receives input of Bozeman, Mont. as a testing location and Mar. 19, 2020 and Mar. 20, 2020 as a time window to perform tests for the asset. In various embodiments, the location and time window correspond to performing test cases of test case set 134 (i.e., an existing set of test cases for an asset). In another aspect, testing program 200 can receive an indication of whether the asset operates indoors or outdoors.

In example embodiments, testing program 200 receive an indication of a testing location and corresponding testing window information at any point of the test case generation process. For example, the user of client device 110 can invoke execution of testing program 200 and input a testing location, for testing program 200 to perform weather prediction and radar forecast for test cases, in accordance with embodiments of the present invention. In another embodiment, testing program 200 identifies an intended usage and/or a testing location for the asset, from the received set of usage parameters (provided in step 202). For example, testing program 200 can parse the received parameters (from step 202) and identify the location of Bozeman, Mont. In an additional example, testing program 200 can identify that the parameters indicate outdoor usage of the asset in Bozeman, Mont.

In another embodiment, if testing program 200 determines that the received parameters (received in step 202) do not include an indication of a usage location, then testing program can send a query to request input of a usage location for the asset. For example, testing program 200 sends a query to a user associated with testing the asset, such as a testing engineer associated with client device 110 or client device 120. In various embodiments, a user of client device 110 or client device 120 can provide input of an actual testing location and/or a hypothetical testing location.

In the previously discussed example scenario of test case set 134 in FIG. 3A, testing engineer Bob (using client device 110) can also provide an indication of Bozeman, Mont. as the testing location for the asset and Mar. 19, 2020 and Mar. 20, 2020 as a time window to perform tests for the asset. In other scenarios, a user can provide a time window (i.e., request weather forecast data for a time window) for varying lengths of time (e.g., one day, one week, one month, ninety days, etc.). In a further aspect, testing engineer Bob (using client device 110) can request to initiate generation of weather-based test cases at a location (e.g., for a hypothetical testing location or an actual intended test location) by selecting an interface element of an application. In an example with respect to FIG. 3B, testing engineer Bob (using client device 110) can select interface element 335 of testing application interface 330 to initiate generation of test cases based on a weather forecast, in accordance with various embodiments of the present invention.

In step 206, testing program 200 determines weather information associated with the location. In one embodiment, testing program 200 queries weather data 140 for weather information based on the location of testing for the asset (from step 204). In additional embodiments, testing program 200 can also utilize other usage parameters of the asset (from step 204) in determining weather information from weather data 140. In example embodiments, the determined weather information includes a weather forecast (i.e., weather prediction) for the location. In additional aspects, the weather forecast is for a defined time window (e.g., indicated in step 204). In a further embodiment, the determined weather information can include historical weather data for a location. In various embodiments, testing program 200 can query weather data 140 for weather forecast information corresponding to the identified location of testing the asset, based on the usage parameters (e.g., location, date, time, climate, etc.).

In example embodiments, testing program 200 can query a weather service (e.g., weather data 140) for meteorological variables for the indicated testing/operation locations of the asset, such as the received location and/or a location indicated in the parameters. For example, the meteorological variables can include temperature, humidity, atmospheric pressure, wind, precipitation, etc. In additional aspects, testing program 200 can also determine additional location data for the identified location of usage, such as coordinates (longitude and latitude), terrain, altitude, nearby bodies of water, currents/conditions of the nearby bodies of water, etc. In another embodiment, testing program 200 can analyze historical weather data for a location to determine historical meteorological variables, including temperature ranges, humidity ranges, atmospheric pressure ranges, wind ranges, precipitation ranges, etc.

In another embodiment, testing program 200 can request a forecast map for the testing location. For example, in response to a request for weather information that includes a forecast map, weather data 140 can provide a radar mapping visualization for the location, that corresponds to a requested time window. In example embodiments, the weather forecast map is a digital file that includes a radar visualization overlaying a map of a location, depicts weather patterns over a time window (e.g., precipitation on Mar. 19, 2020 and Mar. 20, 2020).

In the previously discussed example scenario, Bob had created a plurality of test cases in test case set 134 for testing an asset (depicted in FIG. 3A). In this example scenario, Bob can populate the "Test ID," "Test Case," and "Owner" columns. Then, Bob can (e.g., utilizing client device 110) provide an indication (in step 204) of one or more testing locations to perform test of test case set 134 to testing program 200 (and server 130). In this example scenario, Bob chooses to run tests in Bozeman, Mont. and also indicates a requested testing time window of Mar. 19, 2020 and Mar. 20, 2020. Accordingly, testing program queries weather data 140 for a weather forecast for Bozeman, Mont. and for the testing time window of Mar. 19, 2020 and Mar. 20, 2020.

In step 208, testing program 200 identifies test cases that include weather variables that correspond to the determined weather information associated with the identified location. In one embodiment, testing program 200 identifies one or more test cases from test case set 134 that include weather variables that are present in weather forecast information from weather data 140 (from step 206). In various embodiments, testing program 200 compares meteorological variables of the determined weather information associated with the location to variables in the existing test case set (e.g., test case set 134) to form a matching assessment. For example, testing program 200 identifies a test case that includes a weather variable that matches a forecast weather condition. In another example, testing program 200 can identify a test case that includes a weather variable that is substantially similar to a forecast weather condition (e.g., within a defined threshold of temperature, chance of precipitation, wind speed, humidity, etc.).

In another embodiment, testing program 200 can identify test cases that include a weather variable that matches a weather variable that is included in historical weather information received for a testing location. For example, if testing program 200 determines that historical weather information for the testing location (received from weather data 140) indicates additional weather variables (e.g., in addition to weather variables in the weather forecast), then testing program 200 can identify test cases that include the additional weather variables from the historical weather information. In various embodiments, testing program 200 can identify test cases based on a matching assessment to the determined weather information utilizing weather variables that can include one or more of: a minimum temperature, a maximum temperature, a minimum humidity, a maximum humidity, a minimum atmospheric pressure, a maximum atmospheric pressure, a minimum wind speed, a maximum wind speed, and a minimum precipitation and a maximum precipitation.

In the previously discussed example scenario, testing program 200 queried weather data 140 for a weather forecast for Bozeman, Mont. and for the testing time window of Mar. 19, 2020 and Mar. 20, 2020 to perform test cases in test case set 134. Testing program 200 can then compare the weather forecast to the weather variables in the test cases in test case set 134 to identify related weather variables. For example, testing program 200 identifies that test case set 124 includes test case B1, which is the "Freezing Temperature Engine Start" test. Testing program 200 can then identify that the received weather forecast for Bozeman, Mont. includes forecast temperatures that are below freezing (e.g., from 12 am to 11 am on Mar. 19, 2020). Accordingly, testing program 200 identifies that test case B1 of test case set 134 includes a weather variable that is present in the weather forecast for Bozeman, Mont. In additional embodiments, testing program 200 can complete the weather variable comparison for each test case in the test case set (e.g., each test case in test case set 134), or a subset of the test cases (e.g., defined by a testing engineer, etc.).

In step 210, testing program 200 schedules execution of the identified test cases. In one embodiment, testing program 200 schedules execution of the identified test cases (from step 208) at the testing location for the asset, corresponding to the weather forecast information for the testing location. In example embodiments, testing program 200 schedules execution of test cases when the weather forecast for a location matches weather variables from the test cases (i.e., based on the identification of step 208).

In another embodiment, testing program 200 can utilize forecast information that includes a radar mapping visualization for the location, allowing a testing engineer to pause, rewind, and see future radar visualizations overlaying the map-based views of the scheduled execution of test cases. In an additional embodiment, in response to determining that at least one test case of the test case set includes a weather variable that is not present in the weather forecast for the location (i.e., weather conditions do not meet required variables/parameters of the test case), testing program 200 can send an alert (e.g., to client device 110 and/or client device 120).

In the previously discussed example scenario, testing program 200 identified (in step 208) that test case B1 of test case set 134 includes a weather variable that is present in the weather forecast for Bozeman, Mont. In this example scenario, testing program 200 schedules execution of test case B1 for 6 am on Mar. 19, 2020. Thus, testing program 200 schedules the "Freezing Temperature Engine Start" test for a time in Bozeman, Mont. where the weather forecast indicates a predicted temperature of 24 degrees Fahrenheit (i.e., below freezing).

In additional aspects, testing program 200 can utilize testing preference data (e.g., from storage device 132) for additional testing parameters, such as a window of time for allowed testing (i.e., no testing before 6 am, after 10 pm, ability to overlap test scheduling, etc.). In the depicted example of FIG. 3A, testing program 200 operates for test cases B1, B2, B3, B4, and B5 in test case set 134, to schedule execution of the respective test cases at respective times based on the weather forecast information, in accordance with various embodiments of the present invention.

Figure 3B:
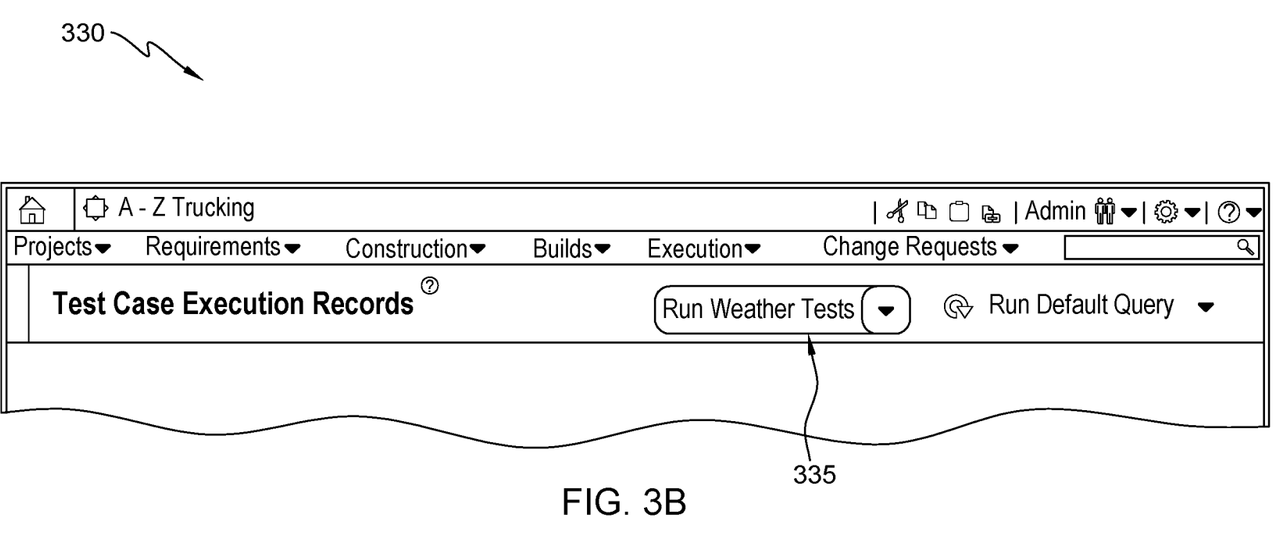
FIG. 3B is an example depiction of an interface of an application for generating and managing test cases, in accordance with various embodiments of the present invention.
Figure 3C:
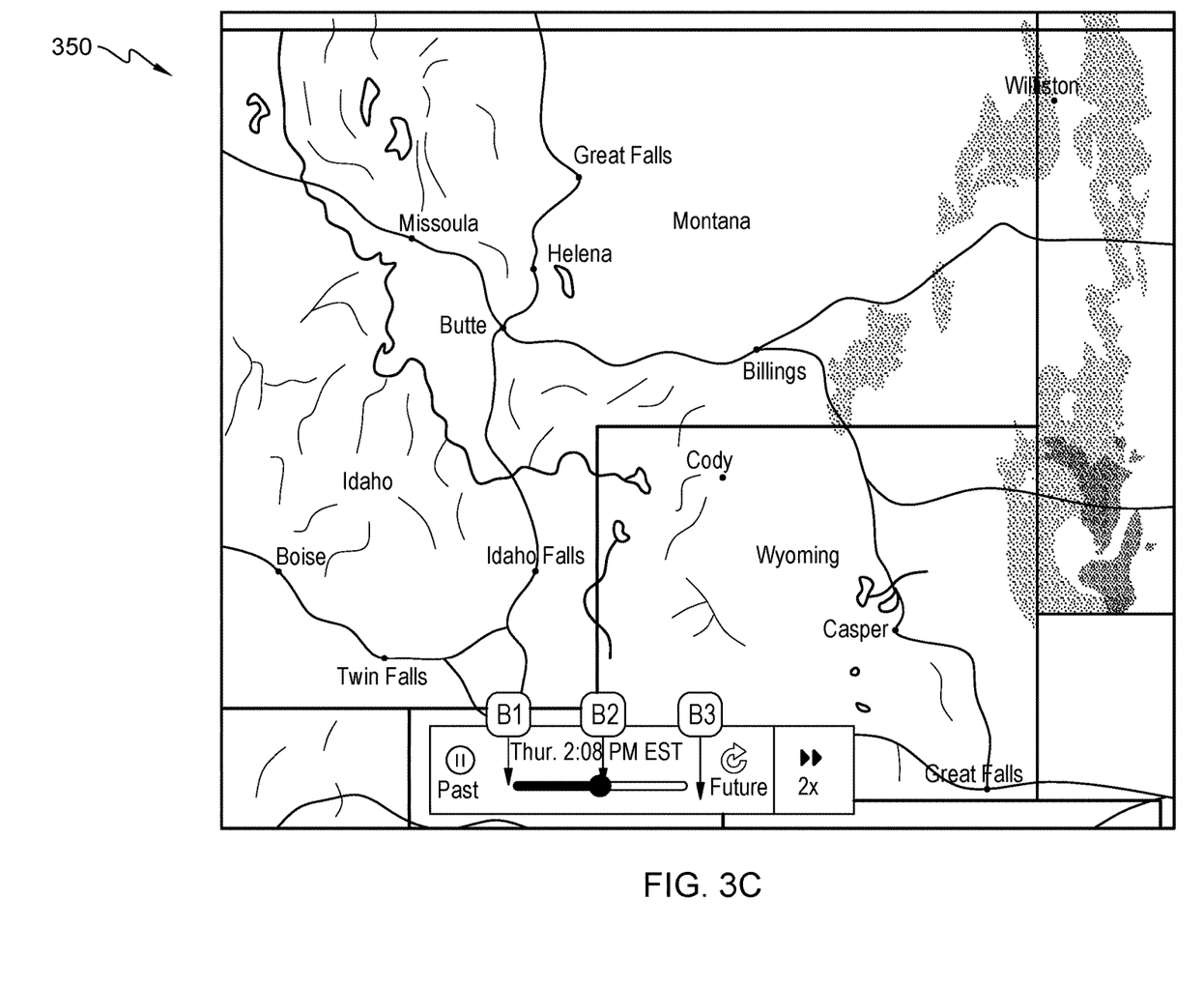
FIG. 3C is an example depiction of a map that includes weather information and indications of relevant test cases, in accordance with various embodiments of the present invention.

In a further aspect with regard to FIG. 3C, testing program 200 can obtain forecast information that includes map 350. In addition, in the depicted example of FIG. 3C, map 350 includes indications of scheduled times to perform test case B1, test base B2, and test case B3, as interface elements overlaying a portion of a weather forecast aspect of map 350. In an example, testing program 200 can receive map 350 as a portion of received weather forecast information from weather data 140, then testing program 200 can overlay indications of test case execution scheduling, such as for test case B1, test base B2, and test case B3.

In step 212, testing program 200 generates additional test cases based on the determined weather information. In example embodiments, testing program 200 determines whether the received weather forecast information for the testing location includes weather variables that are not represented in the test case set. In response to determining that the weather forecast information does include weather variables that are not represented in the test cases, testing program 200 can generate a new test case for a test that utilizes one or more of the (previously not represented) weather variables. Testing program 200 can then schedule execution of the generated new test case based on the weather forecast information for the testing location (i.e., iterate step 210). In another embodiment, testing program 200 can alert a user (a testing engineer) that the weather variable is not represented in the test case set, and then generate a new test case in response to receiving authorization from the user.

In one embodiment, testing program 200 generates one or more test cases (e.g., test case shells) for a test case set of the asset, which take into account the weather information for the identified location for the asset that is not currently represented in the test case set. In an example embodiment, testing program 200 generates a new ELM test case shell for one or more combinations of potential weather information and meteorological data for the location (from step 204). For example, testing program 200 generates test case shells to test weather extremes (e.g., maximum and minimum values) from the weather information for the usage location, which were not currently represented in the test case set. In additional examples, testing program 200 can generate test case shells to include testing variables that test the data characteristics from the weather information (e.g., normal/ expected values, forecast values, median/average values outliers, etc.). A test case shell is a partially populated test case (e.g., for an ELM system, for a product lifecycle management (PLM) system, etc.).

For example, testing program 200 identifies that the determined weather forecast information (from step 206) for Bozeman, Mont. includes a forecast for freezing rain on Mar. 20, 2020 from 6 pm to 8 pm. Testing program 200 can also identify that test case set 134 does not currently include a test case that utilizes freezing rain as a testing variable. Accordingly, testing program 200 can send an alert to Bob, the testing engineer, regarding the weather variable. In response to receiving confirmation from Bob, testing program 200 generates test case T1, a test case for a 40-mph tire test in the freezing rain, depicted in FIG. 3A. Testing program 200 can also schedule execution of the test case for 6 pm on Mar. 20, 2020, to correspond to the weather forecast information.

In various embodiments, testing program 200 can identify potential test cases to generate based on testing parameters for the asset, preference data, historical testing data, historical weather data, or other relevant data sources. In another aspect, testing program 200 can query a user (e.g., Bob) to select a test to use for the test case, to test the weather variable that is not represented in the test case set. For example, the user can indicate one or more tests that utilize the weather variable (e.g., tire test, braking test, etc.), and then testing program can generate the test case (e.g., a test case shell) and populate in accordance with various embodiments of the present invention.

In further embodiments, a user of client device 110 and/or client device 120 can populate the test case shells generated by testing program 200 with any missing and/or requested information. For example, a user of client device 120 can input test results into test case set 134, in response to completion of a corresponding test. In another example, the user of client device 110 (e.g., testing engineer) can modify parameters, priority, etc., of the generated test cases.

FIG. 3A is an example depiction of test case set 134, which includes test cases generated by users and by testing program 200, in accordance with various embodiments of the present invention. In the depicted example embodiment of test case set 134, the user of client device 110 (i.e., Bob) creates test cases B1, B2, B3, B4, and B5 (indicated by the Test ID column), and testing program 200 creates test case T, in accordance with various embodiments of the present invention.

The depicted example of test case set 134 in FIG. 3A includes columns that correspond to respective test cases (indicated by Test ID) and columns that include information and parameters/variables of the respective test cases (i.e., Test ID, Priority, Test Case, Owner, Result, Schedule, Forecast Temperature, Forecast Precipitation, Forecast Wind). Alternative examples of a test case set can include different row and column configurations, based on the asset under test and/or meteorological variables in the weather information. For example, test case set 134 can include weather data columns (e.g., example processes and embodiments for crating and populating test case set 134 are previously discussed in further detail with regard to FIG. 2.

FIG. 3B is an example depiction of an interface of an application for generating and managing test cases, in accordance with various embodiments of the present invention. For example, as depicted in FIG. 3B, testing application interface 330 includes interface element 335, which allows a user to initiate generation of test cases based on a weather forecast, in accordance with various embodiments of the present invention.

FIG. 3C is an example depiction of a map that includes weather information and indications of relevant test cases, in accordance with various embodiments of the present invention. For example, as depicted in FIG. 3C, map 350 includes indications of scheduled times to perform test case B1, test base B2, and test case B3, as interface elements overlaying a portion of a weather forecast aspect of map 350, in accordance with various embodiments of the present invention.

Figure 4:
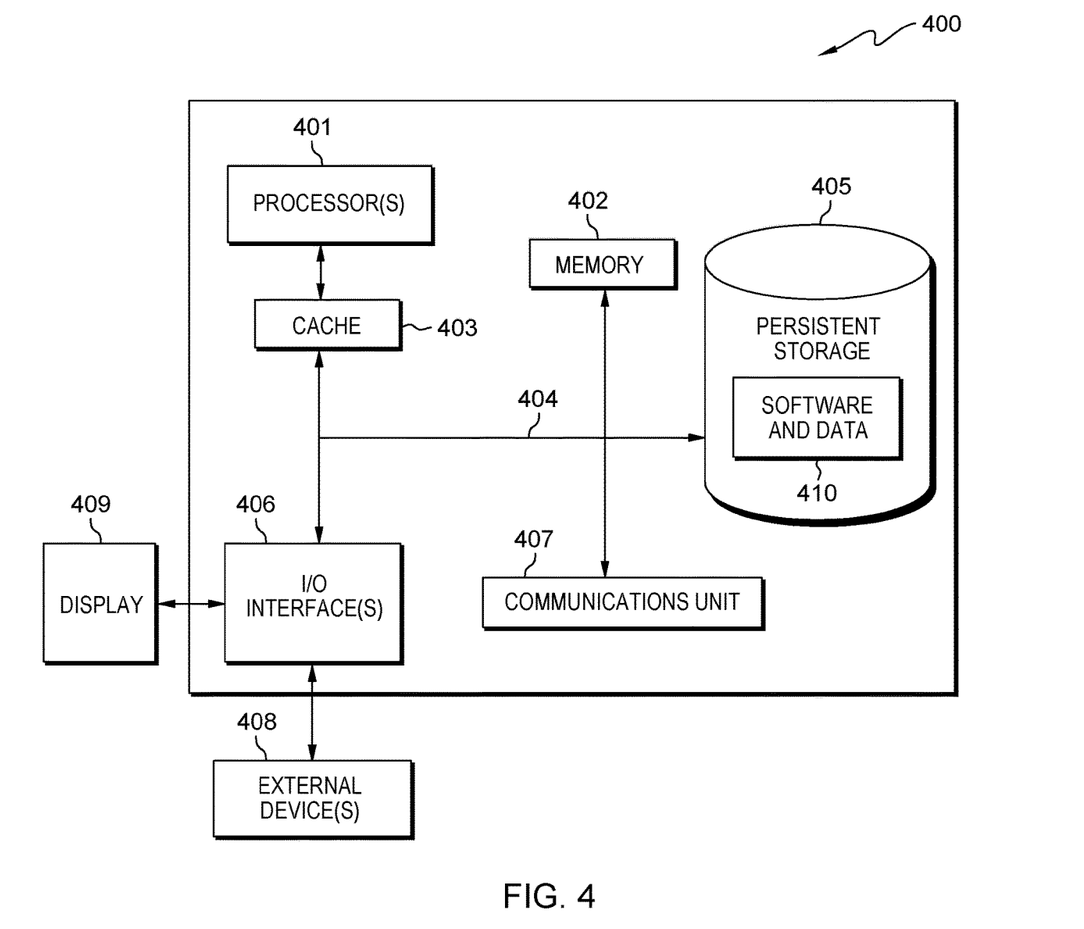
FIG. 4 depicts a block diagram of components of a computing system representative of the client devices and server of FIG. 1, in accordance with an embodiment of the present invention.

FIG. 4 depicts computer system 400, which is representative of client device 110, client device 120, and server 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. Computer system 400 includes processor(s) 401, cache 403, memory 402, persistent storage 405, communications unit 407, input/ output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 110, software and data 410 includes user interface 112 and application 114. With respect to client device 120, software and data 410 includes user interface 122 and application 124. With respect to server 130, software and data 410 includes testing program 200 and test case set 134.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more processors, a set of parameters for an asset, the set of parameters including a test case set for the asset and an indication of a testing location for the asset;
   determining, by one or more processors, weather information that is associated with the indicated testing location;
   identifying, by one or more processors, a test case in the test case set for the asset that includes a weather variable that corresponds to a weather variable that is present in the determined weather information that is associated with the indicated testing location; and
   scheduling, by one or more processors, execution of the identified test case, at the indicated testing location for the asset, based on the determined weather information; wherein scheduling execution of the identified test case, at the indicated testing location for the asset, based on the determined weather information further comprises: scheduling, by one or more processors, execution of the identified test case at the indicated testing location at a date and time that the determined weather information forecasts that the weather variable will be present at the indicated testing location.

2. The method of claim 1, further comprising:
   determining, by one or more processors, whether the determined weather information associated with the indicated testing location includes at least one weather variable that is not represented in the test case set for the asset; and
   in response to determining that the determined weather information associated with the indicated testing location does include at least one weather variable that is not represented in the test case set for the asset, generating, by one or more processors, a new test case for the asset that utilizes the at least one weather variable.

3. The method of claim 2, wherein generating the new test case for the asset that utilizes the at least one weather variable further comprises:
   sending, by one or more processors, an alert to a user associated with testing the asset that the determined weather information associated with the indicated testing location does include at least one weather variable that is not represented in the test case set for the asset;
   receiving, by one or more processors, an indication of a test for the asset that utilizes the at least one weather variable, from the user associated with testing the asset; and
   generating, by one or more processors, the new test case for the asset to include the indicated test that utilizes the at least one weather variable.

4. The method of claim 1, wherein determining weather information that is associated with the indicated testing location further comprises:
   querying, by one or more processors, a weather service for a weather forecast for the indicated testing location for the asset, wherein the determined weather information includes the weather forecast for the indicated testing location for the asset.

5. The method of claim 1, wherein the received set of parameters includes the indication of a testing location for the asset and a request to schedule execution of test cases in the test case set for the asset.

6. The method of claim 1, wherein the determined weather information includes forecast weather variables selected from the group consisting of: temperature, humidity, precipitation, wind, and atmospheric pressure.

7. A computer program product comprising:
one or more computer readable storage media and program instructions stored on the one or more computer readable storage media, the program instructions executed by one or more processors comprising:
program instructions to receive a set of parameters for an asset, the set of parameters including a test case set for the asset and an indication of a testing location for the asset;
program instructions to determine weather information that is associated with the indicated testing location;
program instructions to identify a test case in the test case set for the asset that includes a weather variable that corresponds to a weather variable that is present in the determined weather information that is associated with the indicated testing location; and
program instructions to schedule execution of the identified test case, at the indicated testing location for the asset, based on the determined weather information;
wherein the program instructions to schedule execution of the identified test case, at the indicated testing location for the asset, based on the determined weather information further comprise program instructions to:
schedule execution of the identified test case at the indicated testing location at a date and time that the determined weather information forecasts that the weather variable will be present at the indicated testing location.

8. The computer program product of claim 7, further comprising program instructions, stored on the one or more computer readable storage media, to:
determine whether the determined weather information associated with the indicated testing location includes at least one weather variable that is not represented in the test case set for the asset; and
in response to determining that the determined weather information associated with the indicated testing location does include at least one weather variable that is not represented in the test case set for the asset, generate a new test case for the asset that utilizes the at least one weather variable.

9. The computer program product of claim 8, wherein the program instructions to generate the new test case for the asset that utilizes the at least one weather variable further comprise program instructions to:
send an alert to a user associated with testing the asset that the determined weather information associated with the indicated testing location does include at least one weather variable that is not represented in the test case set for the asset;
receive an indication of a test for the asset that utilizes the at least one weather variable, from the user associated with testing the asset; and
generate the new test case for the asset to include the indicated test that utilizes the at least one weather variable.

10. The computer program product of claim 7, wherein the program instructions to determine weather information that is associated with the indicated testing location further comprise program instructions to:
query a weather service for a weather forecast for the indicated testing location for the asset, wherein the determined weather information includes the weather forecast for the indicated testing location for the asset.

11. The computer program product of claim 7, wherein the received set of parameters includes the indication of a testing location for the asset and a request to schedule execution of test cases in the test case set for the asset.

12. A computer system comprising:
one or more computer processors;
one or more computer readable storage media; and
program instructions stored on the computer readable storage media for execution by at least one of the one or more processors, the program instructions comprising:
program instructions to receive a set of parameters for an asset, the set of parameters including a test case set for the asset and an indication of a testing location for the asset;
program instructions to determine weather information that is associated with the indicated testing location;
program instructions to identify a test case in the test case set for the asset that includes a weather variable that corresponds to a weather variable that is present in the determined weather information that is associated with the indicated testing location; and
program instructions to schedule execution of the identified test case, at the indicated testing location for the asset, based on the determined weather information;
wherein the program instructions to schedule execution of the identified test case, at the indicated testing location for the asset, based on the determined weather information further comprise program instructions to:
schedule execution of the identified test case at the indicated testing location at a date and time that the determined weather information forecasts that the weather variable will be present at the indicated testing location.

13. The computer system of claim 12, further comprising program instructions, stored on the computer readable storage media for execution by at least one of the one or more processors, to:
determine whether the determined weather information associated with the indicated testing location includes at least one weather variable that is not represented in the test case set for the asset; and
in response to determining that the determined weather information associated with the indicated testing location does include at least one weather variable that is not represented in the test case set for the asset, generate a new test case for the asset that utilizes the at least one weather variable.

14. The computer system of claim 13, wherein the program instructions to generate the new test case for the asset that utilizes the at least one weather variable further comprise program instructions to:
send an alert to a user associated with testing the asset that the determined weather information associated with the indicated testing location does include at least one weather variable that is not represented in the test case set for the asset;
receive an indication of a test for the asset that utilizes the at least one weather variable, from the user associated with testing the asset; and
generate the new test case for the asset to include the indicated test that utilizes the at least one weather variable.

15. The computer system of claim 12, wherein the program instructions to determine weather information that is associated with the indicated testing location further comprise program instructions to:

query a weather service for a weather forecast for the indicated testing location for the asset, wherein the determined weather information includes the weather forecast for the indicated testing location for the asset.

16. The computer system of claim 12, wherein the received set of parameters includes the indication of a testing location for the asset and a request to schedule execution of test cases in the test case set for the asset.

17. The computer system of claim 12, wherein the determined weather information includes forecast weather variables selected from the group consisting of: temperature, humidity, precipitation, wind, and atmospheric pressure.

* * * * *